E. RUUD.

FLUID MIXING APPARATUS.

APPLICATION FILED MAR. 27, 1918

Reissued Apr. 6, 1920.

14,836.

2 SHEETS—SHEET 1.

WITNESSES

J. Herbert Bradley

INVENTOR

Edwin Ruud by Jno. Stein

Atty.

E. RUUD.
FLUID MIXING APPARATUS.
APPLICATION FILED MAR. 27, 1918.
Reissued Apr. 6, 1920.
14,836.
2 SHEETS—SHEET 2.
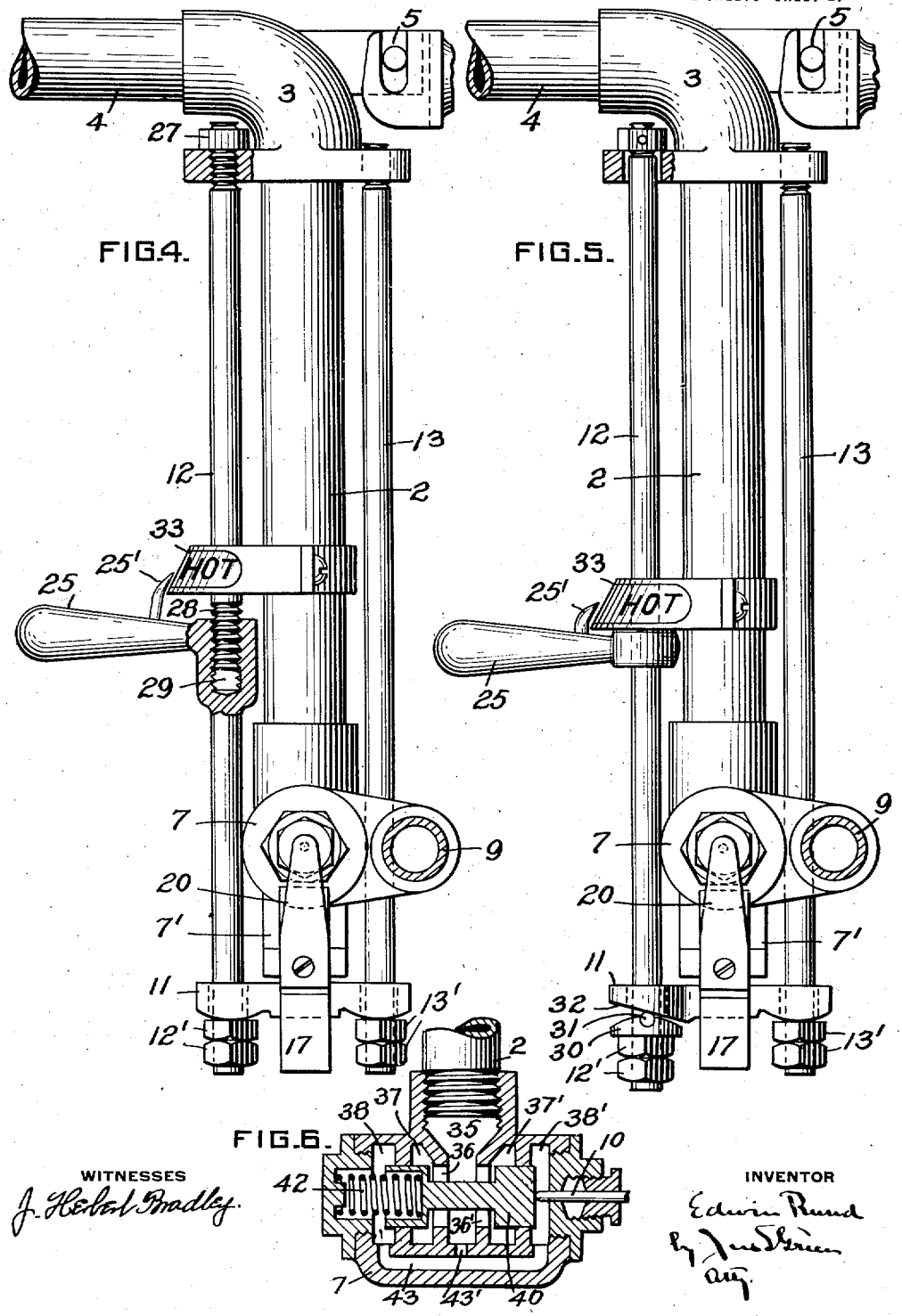
WITNESSES
J. Herbert Bradley.
INVENTOR
Edwin Ruud
By Jas. Shrieve
Atty.

UNITED STATES PATENT OFFICE.

EDWIN RUUD, OF PITTSBURGH, PENNSYLVANIA.

FLUID-MIXING APPARATUS.

14,836. Specification of Reissued Letters Patent. Reissued Apr. 6, 1920.

Original No. 1,257,934, dated February 26, 1918, Serial No. 93,046, filed April 24, 1916. Application for reissue filed March 27, 1918. Serial No. 225,136.

*To all whom it may concern:*

Be it known that I, EDWIN RUUD, a citizen of the United States, and a resident of Pittsburgh, in the county of Allegheny and State of Pennsylvania, have made a new and useful Improvement in Fluid-Mixing Apparatus, of which the following is a specification.

The object of this invention is to provide a simple and efficient mechanism for so automatically controlling the flow of hot and cold fluids as to produce a mixture of substantially uniform predetermined temperature. The apparatus is designed primarily for controlling the flow of water to a shower bath whereby, upon setting the indicator for the approximate temperature desired, the user will be sure that the water will be discharged at that temperature regardless of variations in the hot and cold water service lines. While adapted especially for shower bath use, it will be understood that the invention may be variously utilized for mixing water and other fluids of different temperatures for the purpose of maintaining a delivery of substantially uniform temperature.

Figure 1:
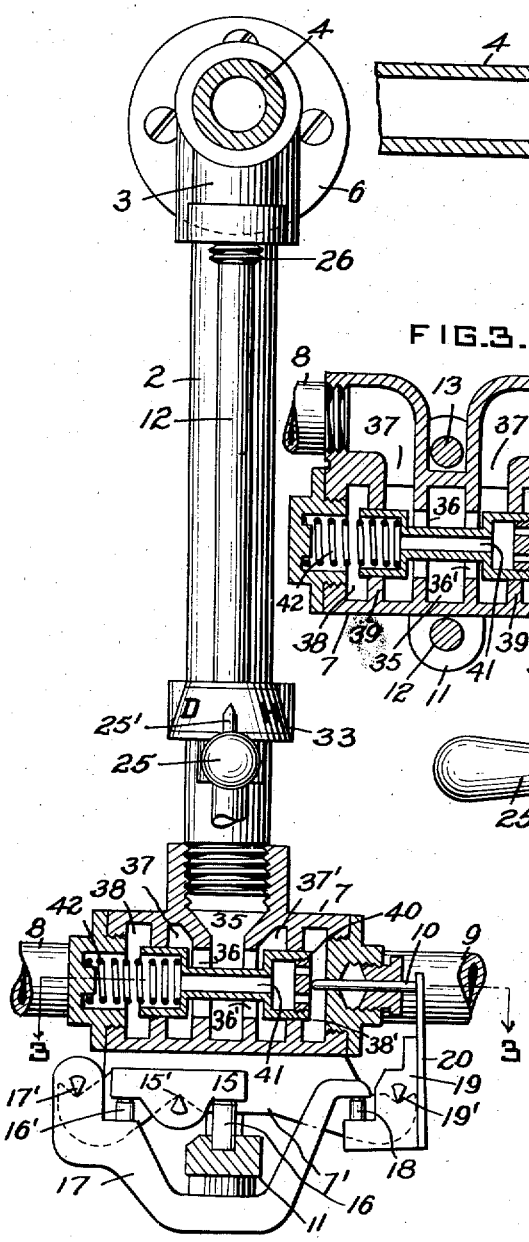
Figure 2:
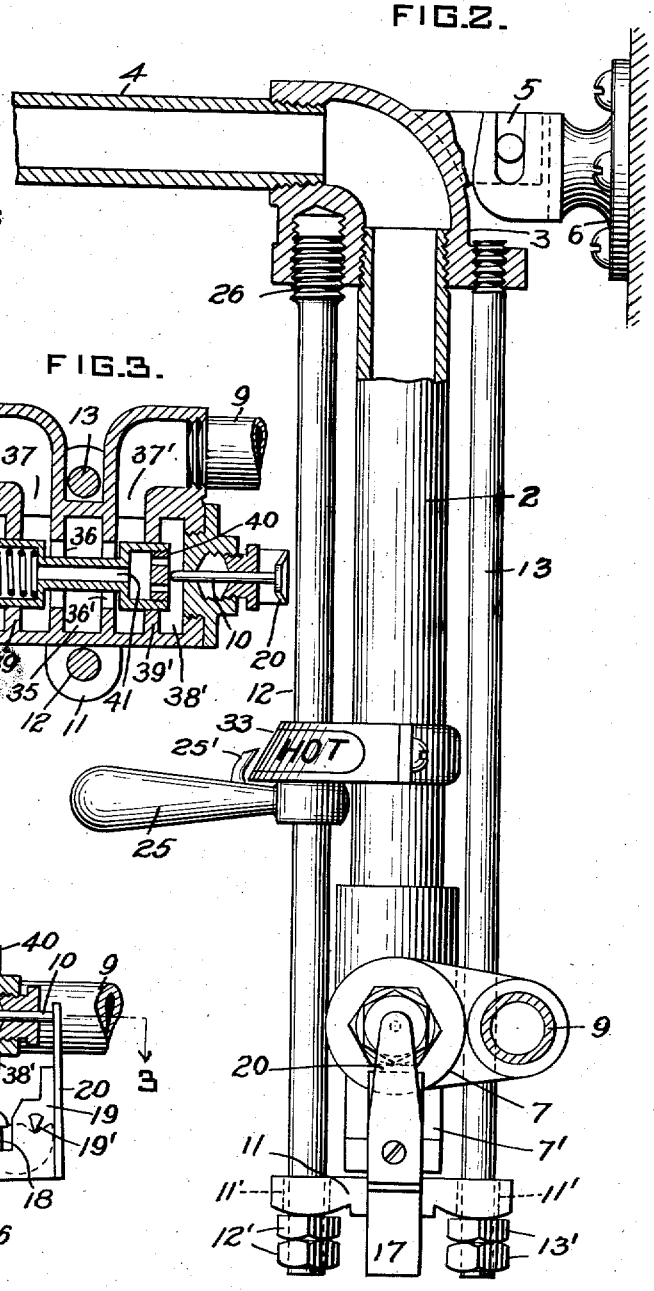
Figure 3:
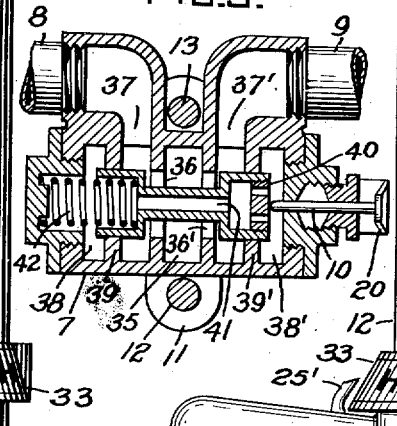

In the accompanying drawings, Figure 1 is an elevation of the improved mechanism, the valve casing and valves being shown in section. Fig. 2 is an elevation taken at right angles to Fig. 1, the outlet portion of the apparatus being shown in section. Fig. 3 is a sectional plan taken on line 3—3 of Fig. 1. Figs. 4 and 5 are elevations similar to Fig. 2, illustrating modifications in the temperature adjusting means. Fig. 6 is a sectional view of a valve casing of modified form.

Referring to the drawings, 2 designates a thermostatic tube of brass or other metal having a high co-efficient of expansion and contraction and which is here illustrated as connected to an elbow fitting 3 from which pipe 4 leads to a suitable outlet, for instance the spray head or nozzle of a shower bath. Fitting 3 may be adjustable vertically at 5 in a wall bracket 6, whereby such slight movement of the apparatus as may result from the expansion and contraction thereof may be compensated for without straining the hot and cold service lines. Secured to and communicating with the lower end of tube 2 is the valve casing 7, and connected to opposite sides of the latter are the cold and hot service pipes 8 and 9, respectively. The chambered interior of casing 7 and the balanced valves coöperating therewith will be presently described, it being sufficient to here note that the valves are operated by means of a longitudinally movable valve stem 10 projecting from one end of casing 7.

Located beneath casing 7, and preferably traversing the axial line of tube 2, is the abutment forming head 11 provided with vertical rod passages 11′ for the supporting rods 12 and 13, the latter arranged at opposite sides of and parallel with tube 2.

The coöperating movement multiplying levers, which comprise a preferred means for converting the movement of tube 2 relatively to abutment 11 into multiplied valve operating movement, consist of lever 15 having knife-edge bearings 15′ located intermediate its ends engaged by the under edge portions 7′ of casing 7. One end of lever 15 engages the bearing pin 16 projecting from abutment 11, and the opposite end thereof engages pin 16′ projecting from the elongated bent lever 17, the knife edge bearing 17′ of this lever engaging the depending portions 7′ of the valve casing. The bend in lever 17 carries it around abutment 11, and the free extremity of said lever engages bearing pin 18 carried by the third lever 19, the knife-edge bearings 19′ of this lever also being mounted in depending portions 7′ of the valve casing. A leaf spring 20 projecting from lever 19 engages stem 10, said spring compensating for abnormal over-throw of the thermostatic mechanism resulting from extreme temperature conditions.

Operation: The heating of tube 2 by the water flowing therethrough results in the expansion of the tube and a corresponding movement of valve casing 7 relatively to abutment 11, the position of the latter being maintained by its support, here shown consisting of rods 12 and 13, which are not appreciably affected by temperature changes. The described movement of the tube and valve casing results in so oscillating the coöperating movement multiplying levers as to move stem 10 to the left, Fig. 1, thereby diminishing the supply of hot water and correspondingly increasing the supply of cold water. And obviously, a reverse operation ensues when the water flowing through tube 2 is sufficiently cold to contract the same, thereby increasing the amount of hot water admitted and decreasing the cold water supply.

The means for adjusting the apparatus to a desired temperature may be variously embodied. This is preferably accomplished by varying the effective length of one of the abutment supporting rods. The total range of adjustment is taken care of by a very slight deflection of the abutment, and the rod passages 11′ formed therethrough are of sufficient size to permit the abutment to accommodate itself to the adjustment desired. In the adaptation shown in Figs. 1 and 2, rod 12 is turned by means of the handle 25, the upper screw threaded extremity 26 of the rod being adjustable in threaded socket 26′ of fitting 3. Abutment 11 is confined on the lower ends of rods 12 and 13 by nuts 12′ and 13′, respectively, so that rod 12 simply turns in the abutment and is shortened or lengthened at its upper end by such turning, as will be understood.

In Fig. 4, rod 12 is formed in two parts, the lower portion being connected to the abutment as in Figs. 1 and 2, and the upper portion secured to fitting 3 by nut 27 and can not rotate. The lower threaded extremity 28 of the upper portion is entered in the threaded socket 29 carried by the lower portion of the rod, with handle 25 projecting from this socket. Thus, by rotating the lower rod section the rod is shortened or lengthened as desired. In the arrangement shown in Fig. 5, rod 12 is rotatable at its upper end in fitting 3, and secured to its lower end above nuts 12′ is washer 30 provided at its upper face with roller 31 which bears on the under inclined face 32 of abutment 11, whereby upon rotating rod 12 the resulting cam action raises or lowers the abutment. In each of the positions shown in Figs. 1 to 4, an indicator 33 is secured to tube 2 and is provided at opposite sides with the words "Hot" and "Cold," with a pointer 25′ on handle 25 extending over the indicator, and by moving the pointer to position opposite one or the other of these designations, or to an intermediate position, the user will know that water of corresponding temperature will be supplied. Obviously, the position of abutment 11 with reference to the valve casing 7 will so affect the throw or the movement multiplying levers as to make them more or less sensitive to temperature variations.

The valve casing 7 is of novel and compact construction. The central cavity 35 thereof, with which the lower end of tube 2 connects, is connected by port 36 with the cold water chamber 37 supplied from cold water pipe 8, and a corresponding port 36′ connects chamber 35 with hot water chamber 37′ to which leads the hot water pipe 9. At the outer side of cold water chamber 37 is the balancing chamber 38, and at the outer side of hot water chamber 37′ is a corresponding chamber 38′. The walls 39 and 39′ separating these chambers respectively, from chambers 37 and 37′ are formed with ports similar to and in line with ports 36, 36′, and fitting said ports are the heads of the double piston valve 40. The heads are hollow and are connected by the tubular stem 41. By this means a balancing action is had, any fluid leaking past either of the valve heads into chamber 38, or 38′, is immediately communicated through the valve to both of said chambers, thereby maintaining the valve in balanced condition. Stem 10 engages one end of the valve, and the pressure imparted through this stem is opposed by spring 42 which bears against the opposite end of the valve.

In the adaptation shown in Fig. 6, the valve is solid instead of tubular, and communication is maintained between chambers 38 and 38′ through the by-pass 43. And instead of depending on the leakage past the valve heads, fluid may be freely communicated to both balancing chambers from delivery chamber 35 through port 43′ connecting said chamber and by-pass 43. With either construction, the operation of the balanced valve is such that more or less hot or cold water is admitted to outlet chamber 35 of the valve casing, as desired. Or with the apparatus in either of the extreme adjustments, as indicated by pointer 25′, either hot or cold water may be used to the exclusion of the other.

With the apparatus adjustably supported in bracket 6, the movements incident to the thermostatic action are compensated for by the slight raising or lowering of the mechanism without changing the position of service pipes 8 and 9, and without subjecting them to strain.

I claim:—

1. In fluid mixing apparatus, the combination of an abutment, a thermostatic tube adapted to expand and contract relatively to the abutment and from which mixed fluid passes, hot and cold fluid inlets for said tube, valves for said inlets, means independent of thermostatic movement for varying the distance between the tube and abutment, and means actuated by the thermostatic movement of the tube relatively to the abutment for operating the valves.

2. In fluid mixing apparatus, the combination of an adjustable abutment, a thermostatic tube through which mixed fluid passes adapted to expand and contract relatively to the abutment and provided with hot and cold inlets, valves for said inlets, and means actuated by the thermostatic movement of the tube relatively to the abutment for operating the valves.

3. In fluid mixing apparatus, the combination of an adjustable abutment, a thermostatic tube through which mixed fluid passes adapted to expand and contract relatively to the abutment and provided with hot and cold fluid inlets, valves for said inlets, and movement multiplying levers interposed between the abutment and the tube and actuated by the thermostatic movement of the latter relatively to the abutment for operating the valves.

4. In fluid mixing apparatus, the combination of an abutment, a thermostatic mixed fluid delivering tube, a valve casing secured to the tube and communicating therewith and having hot and cold fluid inlets, valves for controlling said inlets, and means interposed between the valve casing and the abutment and actuated by the thermostatic movement of the tube for operating the valves.

5. In fluid mixing apparatus, the combination of an adjustable abutment, a thermostatic mixed fluid delivering tube, a valve casing secured to the tube and communicating therewith and having hot and cold fluid inlets, valves for controlling said inlets, and coöperating movement multiplying levers mounted on the valve casing with one of the levers operatively connected to the valve and another of the levers connected to the abutment.

6. In fluid mixing apparatus, the combination of a thermostatic tube having hot and cold fluid inlets and through which mixed fluid flows, an abutment at one end of the tube, an adjustable support for the abutment whereby the position thereof relatively to the tube may be varied, and valve operating means connected to the abutment and to the tube and actuated by the movement of the latter relatively to the abutment.

7. In fluid mixing apparatus, the combination of a thermostatic tube through which mixed fluid flows, a fitting for the tube, an adjustable abutment support outside of said tube and secured to the fitting, an abutment sustained by the support and spaced from the tube, the tube provided with hot and cold fluid inlets, valves for said inlets, and means actuated by the thermostatic movement of the tube relatively to the abutment for operating the valves.

8. In fluid mixing apparatus, the combination of a thermostatic tube through which mixed fluid flows, a fitting to which the tube is secured, support forming rods secured to said fitting outside of said tube, an abutment sustained by the rods and spaced from the tube, means for adjusting one of said rods for varying the position of the abutment, said tube provided with hot and cold fluid inlets, valves for the inlets, and means actuated by the movement of the tube relatively to the abutment for operating the valves.

9. In fluid mixing apparatus, the combination of a thermostatic tube through which mixed fluid flows, a fitting to which the tube is secured, support forming rods outside of said tube and secured to said fitting, an abutment sustained by the rods at the end of the tube distant from said fitting, means for varying the effective length of one of the rods for varying the position of the abutment relatively to the tube, said tube provided with hot and cold fluid inlets, valves for the inlets, and means actuated by the movement of the tube relatively to the abutment for operating the valves.

10. In fluid mixing apparatus, the combination of a thermostatic tube through which mixed fluid flows, a fitting to which the tube is secured, support forming rods secured to said fitting on opposite sides of said tube, an abutment sustained by the rods at the end of the tube distant from said fitting, one of said rods being rotatable for varying the effective length thereof and thereby varying the position of the abutment relatively to the tube and a handle for rotating said rod, an indicator for directing the movement of the handle, said tube provided with hot and cold fluid inlets, valves for the inlets, and means actuated by the movement of the tube relatively to the abutment for operating the valves.

11. In fluid mixing apparatus, the combination of a thermostatic tube through which mixed fluid flows, a fitting to which the tube is secured, a valve casing secured to the end of the tube distant from said fitting and having hot and cold fluid inlets, valves for the inlets, an abutment spaced from the valve casing, an abutment support outside of said tube and secured to said fitting, means for adjusting the support to vary the position of the abutment relatively to the valve casing, and valve operating means interposed between the valve casing and the abutment and actuated by movement of the tube and casing relatively to the abutment.

12. In fluid mixing apparatus, the combination of a thermostatic tube through which mixed fluid flows, a fitting to which the tube is secured, a valve casing secured to the end of the tube distant from said fitting and having hot and cold fluid inlets, valves for the inlets, an abutment spaced from the valve casing, abutment supporting rods located outside of said tube and secured at one end to said fitting and paralleling the tube, means for varying the effective length of one of the rods for varying the position of the abutment relative to the valve casing, and valve operating means interposed between the valve casing and the abutment and actuated by the movement of the tube and casing relatively to the abutment.

13. In a fluid mixing apparatus, a thermostatic tube through which the mixed fluid passes, a valve casing connected to said tube and having a fluid outlet in communication therewith, hot and cold fluid inlets to said casing, a piston valve controlling said inlets, a fluid passage for placing the opposite ends of said valve in fluid pressure equalizing communication, and means actuated by the thermostatic movement of said tube for operating said valve.

14. In a fluid mixing apparatus, a thermostatic tube through which the mixed fluid passes, a valve casing having an outlet connected to said tube and hot and cold fluid inlets, a piston valve having its opposite ends enlarged for controlling said inlets, an equalizing passage connecting the opposite ends of said valve, and means actuated by the thermostatic movement of said tube for operating said valve.

15. In a fluid mixing apparatus, a thermostatic tube through which the mixed fluid passes, a valve casing having an outlet connected to said tube, oppositely disposed hot and cold fluid inlets, a piston valve having its opposite ends enlarged for controlling said inlets, an equalizing passage connecting the outer ends of said valve, fluid controlling ports intermediate the inner ends of said valve, and means actuated by the thermostatic movement of said tube for actuating said valve.

16. In a fluid mixing apparatus, a thermostatic tube through which the mixed fluid passes, a fitting to which one end of the tube is secured, a valve casing having an outlet connected to the other end thereof and provided with hot and cold fluid inlets, a valve controlling said inlets, a fluid passage for subjecting the outer ends of said valve to equalizing pressure, an abutment supported outside of said tube and secured to said fitting, and means for operating said valve through the movement of said tube.

In testimony whereof I affix my signature.

EDWIN RUUD.